US007100092B2

(12) United States Patent
Allred et al.

(10) Patent No.: US 7,100,092 B2
(45) Date of Patent: *Aug. 29, 2006

(54) METHOD AND SYSTEM FOR MONITORING AND TESTING A COMMUNICATION NETWORK

(75) Inventors: Lorin Allred, Sunnyvale, CA (US); Derek J. Nelson, San Diego, CA (US); Mark Milliman, La Jolla, CA (US)

(73) Assignee: Applied Digital Access, Inc., San Diego, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 10/361,527

(22) Filed: Feb. 7, 2003

(65) Prior Publication Data

US 2004/0078717 A1    Apr. 22, 2004

Related U.S. Application Data

(63) Continuation of application No. 08/721,184, filed on Sep. 27, 1996, now Pat. No. 6,519,723.

(51) Int. Cl.
*G06F 11/00* (2006.01)

(52) U.S. Cl. .......................................... 714/43; 370/241

(58) Field of Classification Search .................. 714/43, 714/32, 27, 47, 48, 56; 370/241, 242
See application file for complete search history.

(56) References Cited

U.S. PATENT DOCUMENTS

| 3,920,975 | A | * | 11/1975 | Bass ........................... 714/716 |
| 5,027,343 | A | | 6/1991 | Chan et al. |
| 5,202,921 | A | * | 4/1993 | Herzberg et al. ............ 713/162 |
| 5,299,257 | A | | 3/1994 | Fuller et al. |
| 5,375,126 | A | | 12/1994 | Wallace |
| 5,481,548 | A | | 1/1996 | Wallace |
| 5,490,199 | A | | 2/1996 | Fuller et al. |
| 5,500,853 | A | * | 3/1996 | Engdahl et al. ............. 370/252 |
| 5,528,748 | A | | 6/1996 | Wallace |

(Continued)

FOREIGN PATENT DOCUMENTS

EP    0 520 117 A1    6/1991

(Continued)

OTHER PUBLICATIONS

Brinksfield, J.G., "Unified Network Management Architecture (UNMA)", Digital Technology, Philadelphia, PA, pp. 1135-1141, XP 000013853, Jun. 12-15, 1988.

(Continued)

*Primary Examiner*—Nadeem Iqbal
(74) *Attorney, Agent, or Firm*—Allen, Dyer, Doppelt Milbrath & Gilchrist, P.A.

(57) ABSTRACT

A protocol analysis access system ("PAAS") and a restricted access method for remotely monitoring and testing embedded channels in a signal communicated over a telecommunications network. The PAAS system is capable of accessing a signal from a network circuit through digital cross-connect systems ("DCSs") or through direct connections. In case of restricted network access, the PAAS performs non-intrusive monitor-only function on the signal without interfering with or interrupting the data flow over the network circuit. In addition, the PAAS system is capable of performing non-intrusive conformance testing on a signal using a protocol analyzer. In case of non-restricted network access, the PAAS system allows full performance testing on a signal. The PAAS system functions are executed by an external command source from a remote network maintenance center via remote control links. The monitor-only and test results are reported back to the remote network maintenance center for further analysis.

48 Claims, 9 Drawing Sheets

U.S. PATENT DOCUMENTS

| | | | |
|---|---|---|---|
| 5,553,056 A * | 9/1996 | Bronte et al. | 370/253 |
| 5,602,828 A * | 2/1997 | Engdahl et al. | 370/228 |
| 5,615,225 A | 3/1997 | Foster et al. | |
| 5,621,720 A * | 4/1997 | Bronte et al. | 370/241 |
| 5,623,480 A * | 4/1997 | Hartmann et al. | 370/241 |
| 5,680,391 A | 10/1997 | Barron et al. | |
| 5,691,973 A | 11/1997 | Ramstrom et al. | |
| 5,691,976 A * | 11/1997 | Engdahl et al. | 370/242 |
| 5,790,523 A * | 8/1998 | Ritchie et al. | 370/241 |
| 5,796,953 A * | 8/1998 | Zey | 709/227 |
| 6,519,723 B1 * | 2/2003 | Allred et al. | 714/712 |

FOREIGN PATENT DOCUMENTS

| | | |
|---|---|---|
| EP | 0 513 609 A2 | 4/1992 |
| EP | 0 558 234 A1 | 2/1993 |
| WO | WO 94/15419 | 12/1993 |

OTHER PUBLICATIONS

Rosenbilt, Moshe, "TMN Security Management Standards in North America", mrozenbl@notes.cc.bellcore.com, pp. 294-297, XP 000641105.

* cited by examiner

METHOD AND SYSTEM FOR MONITORING AND TESTING A COMMUNICATION NETWORK

RELATED APPLICATIONS

This application is a continuation of, and hereby claims priority to and incorporates by reference in its entirety, U.S. patent application Ser. No. 08/721,184 entitled "FIREWALL PERFORMANCE MONITORING AND LIMITED ACCESS SYSTEM", which was filed on Sep. 27, 1996 now U.S. Pat. No. 6,519,723.

BACKGROUND OF THE INVENTION

1. Field of the Invention

The present invention relates to telephone networks, and more particularly to a system and method for accessing, monitoring and testing a telephone network.

2. Description of the Related Technology

For some time, public switched telephone networks (PSTN) have utilized time division multiplexing (TDM) transmission systems to communicate both voice and data signals over a digital communications link. For example, digital signal level 1 (DS1), and more recently digital signal level 3 (DS3), data paths have long been used to carry both voice and data signals over a single transmission facility. DS1 data paths carry DS1 signals which are transmitted at a transmission rate of 1.544 Mbps, and DS3 data paths carry DS3 signals which are transmitted at a transmission rate of 44.736 Mbps. Consequently, both DS1 and DS3 data paths offer the advantage of considerably reducing the number of lines required to carry information that otherwise would be required without time division multiplexing the digital voice and data signals.

Nowadays, there are several regional Bell operating companies and independent telephone companies which provide local telephone service within numerous local access transport areas (LATA). These companies are forced to rely on interexchange carriers such as AT&T, MCI and Sprint for transmission of calls from one LATA to another. As a result, a long distance call or transmission from one end-user to another involves many levels of multiplexing and many transport carrier handoffs. The responsibility for quality and performance of the telephone circuit is thus split between local telephone companies and interexchange carriers.

Telephone companies often need an economical way to access circuits for testing and protocol analysis. Typically, each telephone company dispatches multiple repair crews with portable test equipment to a number of locations. The locations include the network boundary between the long distance and the local telephone company, the telephone building nearest the end-user, and to outside facilities such as the cables and equipment beneath streets and on poles between the central offices and the end-user customer. This method of maintenance results in significant inefficiencies. Hence, solutions which do not require dispatching repair crews with portable test equipment when problems occur were created. Today, telephone companies equipped with advanced systems can monitor circuits remotely from a network management center. However, with the split in responsibility among telephone companies comes significant difficulties in maintaining network circuits, troubleshooting and isolating transmission faults over their data paths: logical faults (which are protocol dependent) and physical faults (which are circuit dependent). Moreover, and perhaps more importantly, with data services and voice services sharing common networks, an organization maintaining a network common with another organization could easily access, interfere or disrupt circuit communications for the other organization.

Most network elements incorporate some form of monitoring, test, and control of the data that they process. However, none of these options supports the monitor-only function or restricted access (firewall) feature of the present invention. The U.S. Pat. No. 5,375,126 to Hekimian Laboratories, Inc., apparently describes a system which provides physical and protocol testing of digital data system (DDS). The Hekimian system, however, does not offer the firewall functionality of restricting or preventing a technician from accessing or interrupting unauthorized network circuits or other organization's equipment.

Thus, a restricted access method that provides continuous performance monitor-only of DS3 embedded channels and technician access restricted to authorized equipment are desired. It is desired to have a system which provides comprehensive, full-time performance monitoring-only of DS3 embedded channels (i.e. DS1, DS0 and subrate channels) through a digital cross-connect system (DCS) or directly connected circuits. It is further desired to provide a system having restricted circuit access (firewall feature) by data network technicians to ensure that a network organization accesses only its own equipment or authorized facilities. With the restricted access feature, other organizations will no longer have to be concerned about unauthorized access to their circuits nor about interference or interruption caused by unauthorized access by data network technicians. In addition, it is also desired to provide testing of DS1, DS0 and subrate circuits, along with an extensive suite of test capabilities for HiCap, DDS and VF services only for authorized or core network technicians.

SUMMARY OF THE INVENTION

The present invention provides a protocol analysis access system (PAAS) and a restricted access method to allow telephone companies to monitor and test their communication networks without accessing or interfering with other restricted-access networks. From a telephone company's network maintenance center, a data network technician can remotely monitor and test a network via an X.25 or Ethernet remote control link. By executing specific and a limited number of transaction language 1 (TL1) commands at the network maintenance center, the technician can perform non-intrusive and real-time access, monitor-only and testing of DS0 and DS1 signals. In addition, by allowing a technician to execute specific commands only, the technician is prevented from testing unauthorized equipment network, i.e. those networks with access restricted to "core" network technicians.

In one aspect of the present invention, in a telephone network, a signal access system is provided comprising an analyzer capable of performing testing on a service layer, an interface device connected to the analyzer, wherein the interface device is capable of receiving a signal and performing non-intrusive monitor-only function on the signal, and an external command source providing commands to the interface device, wherein the commands include a monitor-only request.

Furthermore, in another aspect of the present invention, a signal access system is provided which is capable of restricting access to a signal of a selected circuit comprising an analyzer capable of performing testing on a service layer, an interface device connected to the analyzer, and an external command source providing commands to the interface device, wherein the commands include a test access request.

There are multiple configurations for the system of the present invention. In a first configuration as presently embodied, a technician transmits TL1 commands to a Test System Controller/Remote Test Unit (TSC/RTU) installed at a remote location to allow monitor and test access to a network through a digital cross-connect system (DCS). In a second configuration, a technician transmits TL1 commands to an Integrated Test Access Unit (ITAU) installed at a remote location to allow monitor and test access to a network directly. In both configurations, the technician has monitor and test access to a wideband signal using a Facility Access Digroup (FAD) port, and a narrowband signal using a Test Access Digroup (TAD) port. Furthermore, in order to perform service layer testing for a network circuit, a T1 based protocol analyzer is connected to the TSC/RTU (in case of DCS connection) or to the ITAU (in case of direct connection) through a FAD port for wideband signal test access or a TAD port for narrowband signal test access. The ITAU or TSC/RTU performs non-intrusive testing (through monitor-only) on the signal and, when the testing is complete, the signal is passed on or released to the protocol analyzer. Subsequently, at the network maintenance center, a technician executes special commands using an external command source (ECS) and remotely controls the protocol analyzer via a separate control link to perform service layer conformance testing of the signal protocol implementation. When the test access is completed, the technician clears the test and instructs the ITAU or the TSC/RTU to release the port.

DETAILED DESCRIPTION OF THE PREFERRED EMBODIMENTS

Reference is now made to the drawings wherein like numerals refer to like parts throughout this application.

For convenience, the following description will be outlined into five main sections: (I) System Overview; (II) Interface Device; (III) Analyzer Set; (IV) External Command Source; and (V) Method of Operation.

I. System Overview

Figure 1:
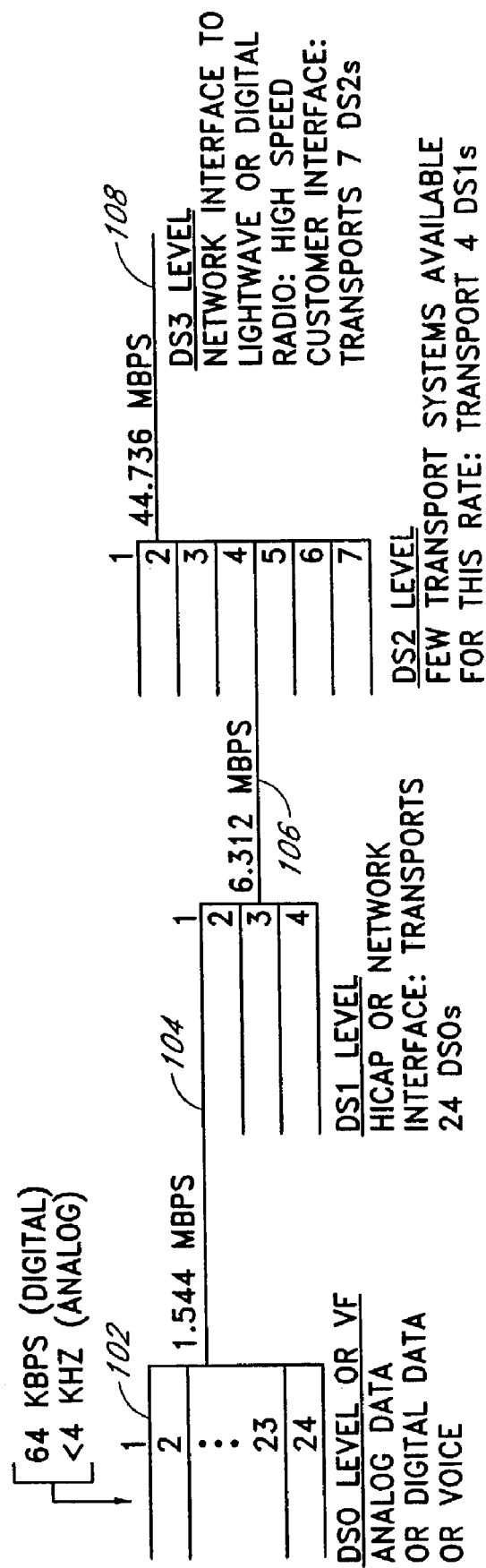
FIG. 1 is a diagram of the North American digital hierarchy used in a telephone network accessed by the present invention.

In FIG. 1, an analog signal (bandwidth<4 Khz) or voice frequency (VF) 102 is digitally encoded. A plurality of these signals can then be combined with digital data signals and multiplexed into one digital signal level 1 (DS1) 104. A signal at the DS1 level is formed by the time-division multiplexing (TDM) of 24 voiceband signals. Pulse-code modulation (PCM) converts these analog signals to digital. The DS1 signal has 24 channels each having a data transmission rate of 64 kbps. A framing bit is used to identify each group of 24 channels. The DS1 signal has a rate of 1.544 Megabits per second (Mbps). This signal forms the basic building block of the North American digital time-division multiplexing hierarchy. Up to 28 DS1 signals 104 are multiplexed to form a DS3 signal 108 which operates at a transmission rate of 44.637 Mbps. Like the DS1 signal 104, the DS3 signal 108 is a digital bipolar signal structured into frames.

Figure 2:
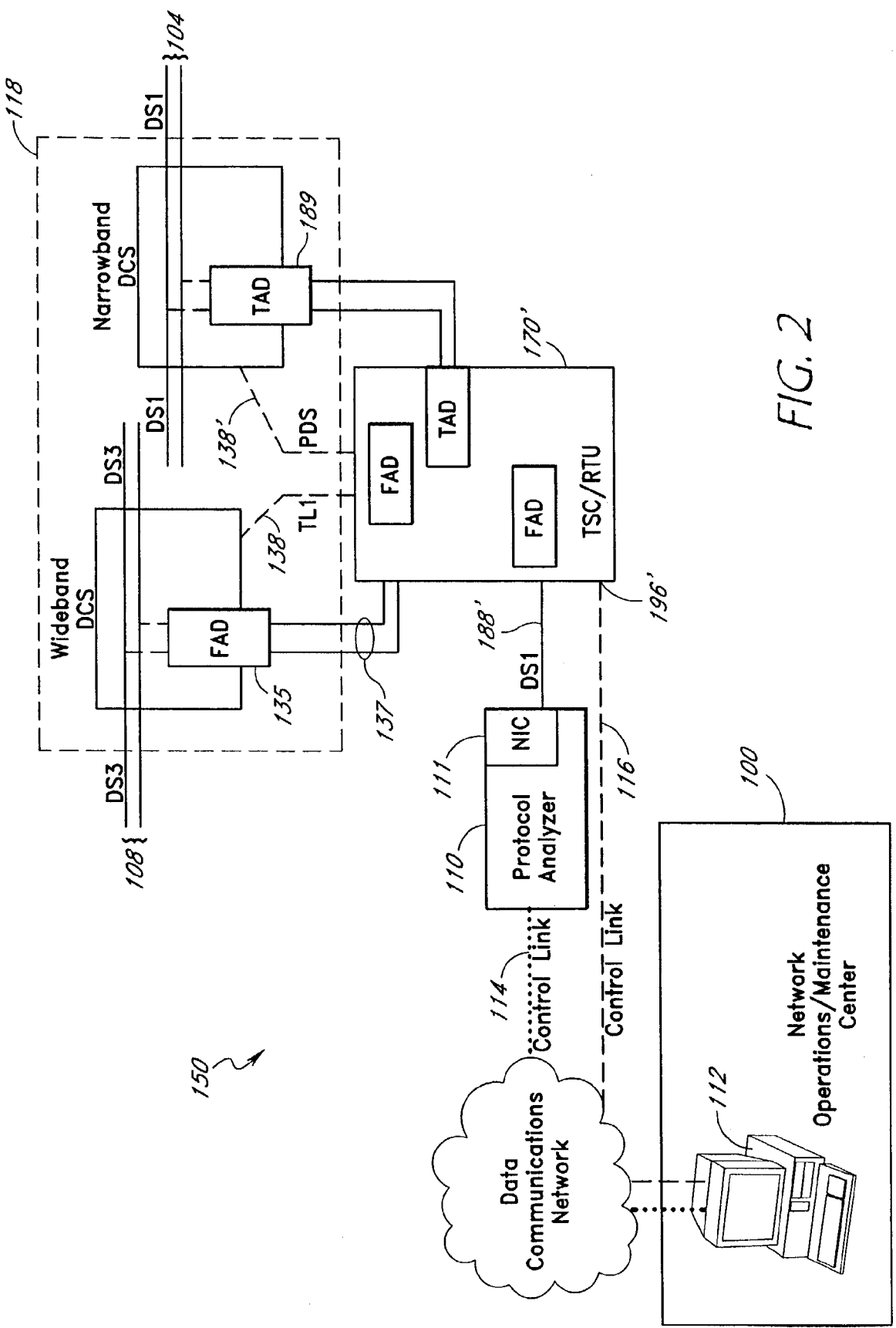
FIG. 2 is a block diagram of an exemplary protocol analysis access system (PAAS) of the present invention configured with a digital cross-connect system (DCS).

In one aspect of the present invention, the protocol analysis access system (PAAS) operates in at least one of two main configurations. As shown in FIG. 2, in one configuration of the present invention, the PAAS system 150, comprises an interface device 170', an analyzer 110, and an external command source (ECS) 112. In this configuration, an exemplary interface device 170' is a test system controller/remote test unit (TSC/RTU). The TSC/RTU 170' receives control commands from the ECS 112 via a remote control link 116. The remote control link 116 is preferably an X.25 or Ethernet control link.

In a typical configuration, there may be multiple digital cross-connect systems (DCSs) 118 connected to the same TSC/RTU 170' system. The TSC/RTU 170' system provides monitor-only access on those circuits of restricted networks through a DCS 118. The TSC/RTU system provides full test access on a network circuit through a DCS 118 where full test access is authorized. The restriction status determination of the signal of a selected network circuit may be accomplished using one, or a combination, of several embodiments. In one embodiment, the TSC/RTU 170' may determine whether access, monitor-only, or full test may be performed on the signal of the selected circuit. In a second embodiment, the DCS 118 may determine whether access, monitor-only, or full test may be performed on the signal of the selected circuit. The TSC/RTU, or the DCS, reaches its determination by preferably referring to an internal network element database wherein the requested access point restriction status is derived from a pre-programmed characteristics list in the database. In a third embodiment, a user-identification, privilege code, or password may be used to classify a technician's access ability to perform access, monitor-only or full test on the signal of the selected circuit. In a fourth embodiment, the status of the selected circuit may be used to determine whether to perform access, monitor-only or full test on the signal of the selected circuit. In this embodiment, the TSC/RTU 170', DCS 118, or other equipment, preferably accomplishes this determination by analyzing circuit header information retrieved from the selected circuit. The choice among one or several of these embodiments will often depend on the system configuration and the telecommunications company's network maintenance requirements.

The TSC/RTU 170' connects to one or more of the T1 connections 135 or 189 on the DCS 118 to access the network circuit 108. A narrowband signal on a T1 connection 189 is called a Test Access Digroup (TAD) 110. A wideband signal on a T1 connection 135 is called a Facility Access Digroup (FAD). When testing is performed on a network circuit, the DCS 118 cross-connects a test channel to the TAD 189 or FAD 135. For DS1 access, a test access path (TAP) 137 consists of two digroups that are normally referred to as a FAD. In addition, the TSC/RTU 170' system communicates with and controls the DCS 118 using TL1 and/or program documentation system (PDS-Snyder) commands via an X.25, Ethernet, frame relay circuit, asynchronous RS-232 interface, or an ATM control link 138/138'.

Figure 3:
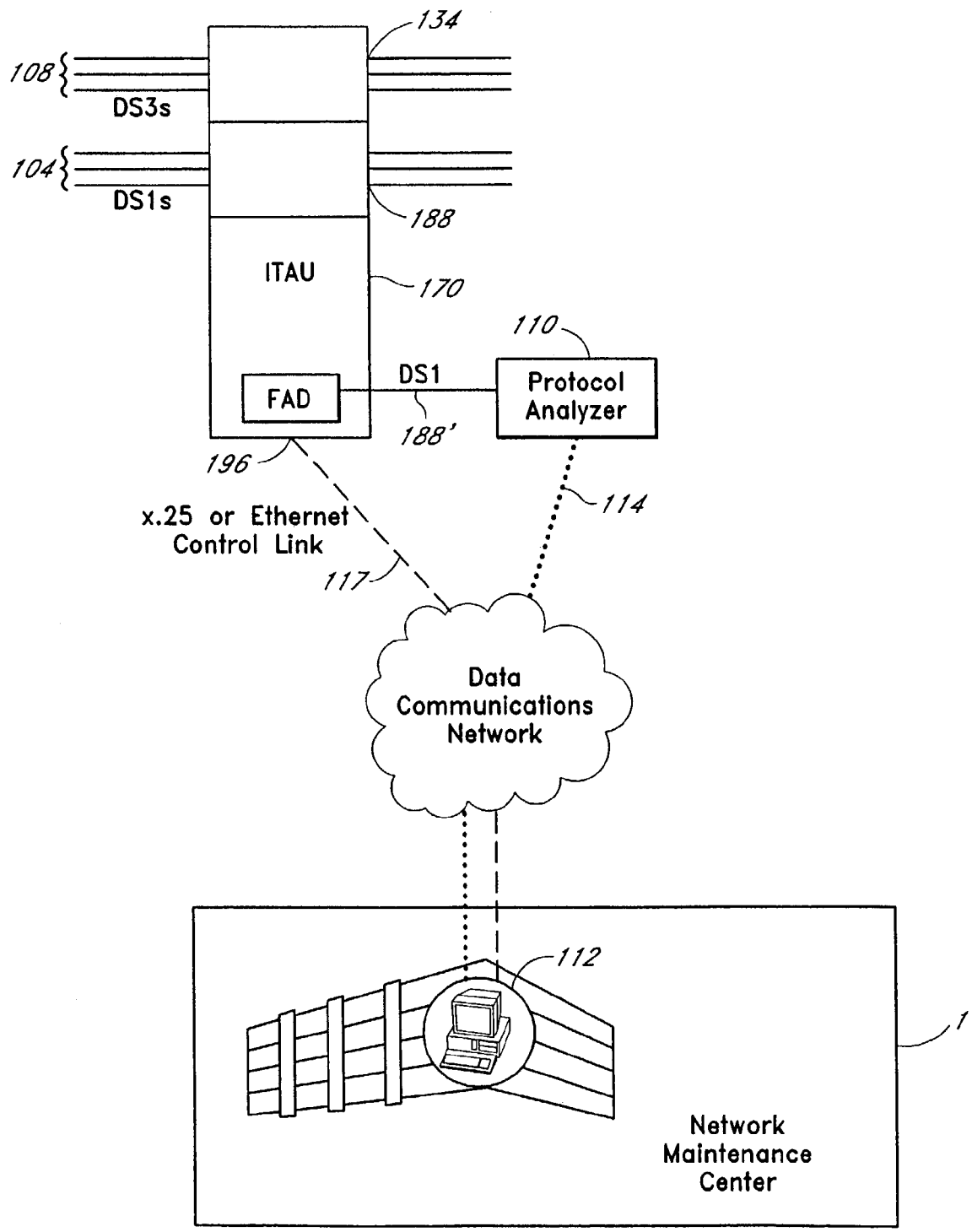
FIG. 3 is a block diagram of an exemplary protocol analysis access system (PAAS) of the present invention configured with an integrated test access unit (ITAU).

As shown in FIG. 3, in another configuration, an exemplary interface device is an integrated test access unit (ITAU) 170. The ITAU 170 receives control commands from the ECS 112 via a remote control link 117. The remote control link 117 is preferably an X.25 or Ethernet control link. The ITAU 170 device provides test access to a network circuit 108 through direct connections 134 or 188 on the network circuit. Similar access, monitoring-only and testing provided by the TSC/RTU 170' is also provided using the ITAU 170. Moreover, when using the ITAU 170, the PAAS system can perform restriction determinations similar to those discussed above with respect to the TSC/RTU 170', excluding the DCS determinations. In addition, real-time performance monitoring is collected on all circuits connected in-line with the ITAU 170.

Monitor-only Function

Figure 9:
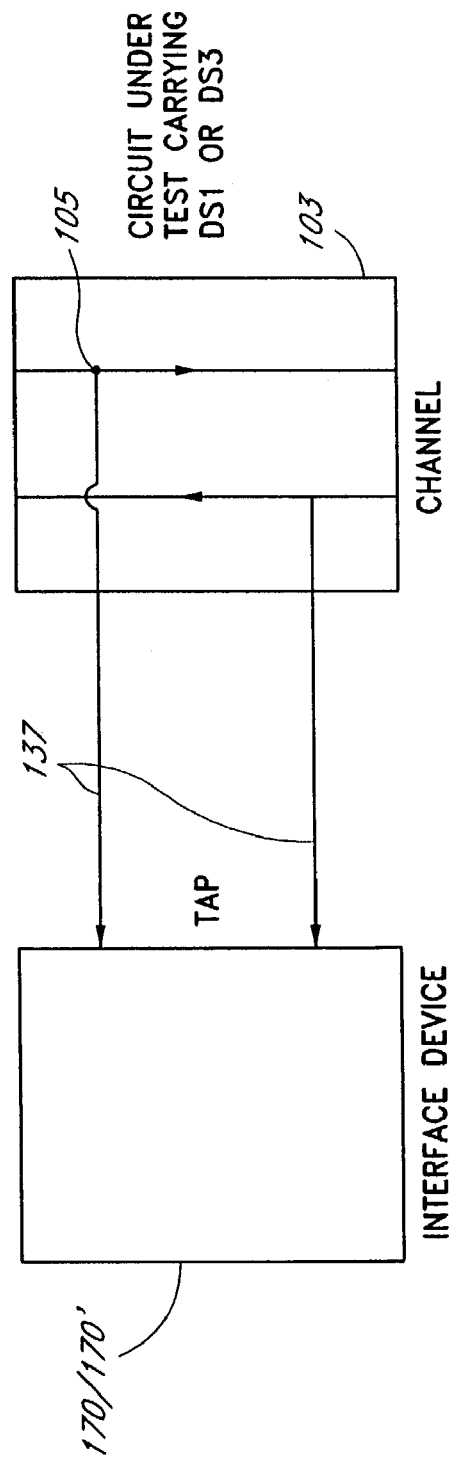
FIG. 9 is a diagram of the application of the non-intrusive monitor-only function by the protocol analysis access system (PAAS).

As shown in FIG. 9, a network circuit 103 under test is monitored in both directions (bi-directional) via test access paths (TAPs) 137. Monitor access provides a hitless monitor connection onto the channel under test or DS1 facility. The channel transmission continues normally during monitoring, with the test access connection transparent to the channel. The monitor access function does not affect the channels and digroups not selected for access. A monitor access connection does not interfere with or disrupt the digital signal passing over the DS1 facility. The monitored signal from the channel under test is placed through a TAP onto a TAD or FAD so that it may be received by the interface device 170/170'.

For DS1 access, monitoring may be used to measure, without splitting the data flow in the circuit, a test signal at an intermediate location 105 while testing is underway between other points on the circuit. Monitor access of the DS1 facility is conceptually similar to DS0 access, but it is physically different because separate digroups are used and the DS1 signal of only one side of the circuit access is brought to the test system for observation. This monitor-only function allows a technician to determine the status of a circuit without disturbing or interrupting the data flow through the circuit. More particularly, the performance of a circuit is checked without causing bit errors on the accessed DS1 signal, i.e., non-intrusively.

Referring again to FIGS. 2 and 3, the control link 116/117 is a data path between the ECS 112 and the Interface Device 170/170' that carries commands from the ECS 112 and responses from the Interface Device 170/170'. Alarm and status information may also be carried by the control link 116/117.

When service layer testing is desired, a T1 based protocol analyzer 110 is connected to the TSC/RTU 172 or ITAU 170 through a DS1 TAD or DS1/DS3 FAD port 135. The TSC/RTU 170' or ITAU 170 performs non-intrusive physical layer testing on a desired circuit. When the physical layer testing is completed, the TSC/RTU 170' or ITAU 170 passes the circuit to the protocol analyzer 110 for further detailed testing and protocol conformance analysis. At the network maintenance center 100, a technician can use a remote computer 112 to control the protocol analyzer via a separate X.25 or Ethernet control link 114. The technician can command the protocol analyzer 110 to perform service layer conformance and other detailed testing including full and fractional T1 testing of logical errors, frame errors, CRC errors, packet densities, addresses, header information, slips, PRM, trouble scan, timeslot monitor and DDS code display. When the test access is no longer required, the technician can clear the test from the ECS 112 and the TSC/RTU 170' instructs the DCS 118 to release the port 135 or 189.

II. Interface Device

The kind of interface device used in this invention depends on the desired access application. If access to a network circuit through a digital cross-connect system (DCS) 118 is desired, an exemplary interface device is a test system controller/remote test unit (TSC/RTU) 170'. For this configuration, an interface device which meets or exceeds the TSC/RTU 170' specifications is the Centralized Test System ("CTS") manufactured by Applied Digital Access, Inc., the assignee of the present invention. If direct access to a network circuit is desired, an exemplary interface device is an integrated test access unit (ITAU) 170. For this configuration, an interface device which may meet or exceed the ITAU 170 specifications is the T3AS system manufactured by Applied Digital Access, Inc., the assignee of the present invention.

A. Access Through a Digital Cross-Connect System (DCS)

As shown in FIG. 2, the TSC/RTU 170' provides test access to DS0 and DS1 circuits that are transported over telephone networks through synchronous or asynchronous interfaces on digital cross-connect systems (DCSs) 118. The TSC/RTU 170' system access as any circuit up to DS1 signal level through DS1 test access digroup (TAD) ports 189 on narrowband DCSs 118, and DS1 or DS3 facility access digroup (FAD) ports 135. More particularly, the TSC/RTU 170' interfaces to a 1/0 cross-connect through the DS1 TAD port 189, to a 3/1 cross-connect through the DS1 or DS3 FAD port 135 to access any individual circuit up to a DS1 signal level. The TSC/RTU 170' is a highly integrated application which permits both DS0 and DS1 test access within a single DS1 access unit.

In this configuration, the TSC/RTU 170' platform is configured to provide access to narrowband and wideband circuits that are provisioned for advanced data services such as frame relay, switched Megabit data system (SMDS) or asynchronous transfer mode (ATM). In this configuration, the TSC/RTU 170' provides circuit testing and connects circuits to a protocol analyzer 110 for more detailed troubleshooting, e.g. conformance testing. With the ECS 112, the TSC/RTU 170' provides a cost-effective method to access circuits from a centralized network maintenance center 100.

The TSC/RTU 170' accesses channels embedded in a DS1 and DS3 circuits through DCS systems 118. When a technician initiates a command using the ECS 112 to access or monitor a specific DS0 or DS1 circuit, the TSC/RTU 170' configures the test access request via a control link 138 to the DCS 118. Subsequently, the DCS 118 gives the TSC/RTU 170' monitor-only access on the TAD 135 or FAD 189 ports. The TSC/RTU 170' performs a complete suite of tests on VF, DDS, and HCDS service to a DCS 118. The TSC/RTU 170' tests the desired circuits, and instructs the DCS 118 to release the test port 135/189. The results are then reported or sent to the ECS 112 for the technician's analysis. Details on the reported test results or monitoring parameters are discussed in the External Command Source section IV of this application.

Figure 4:
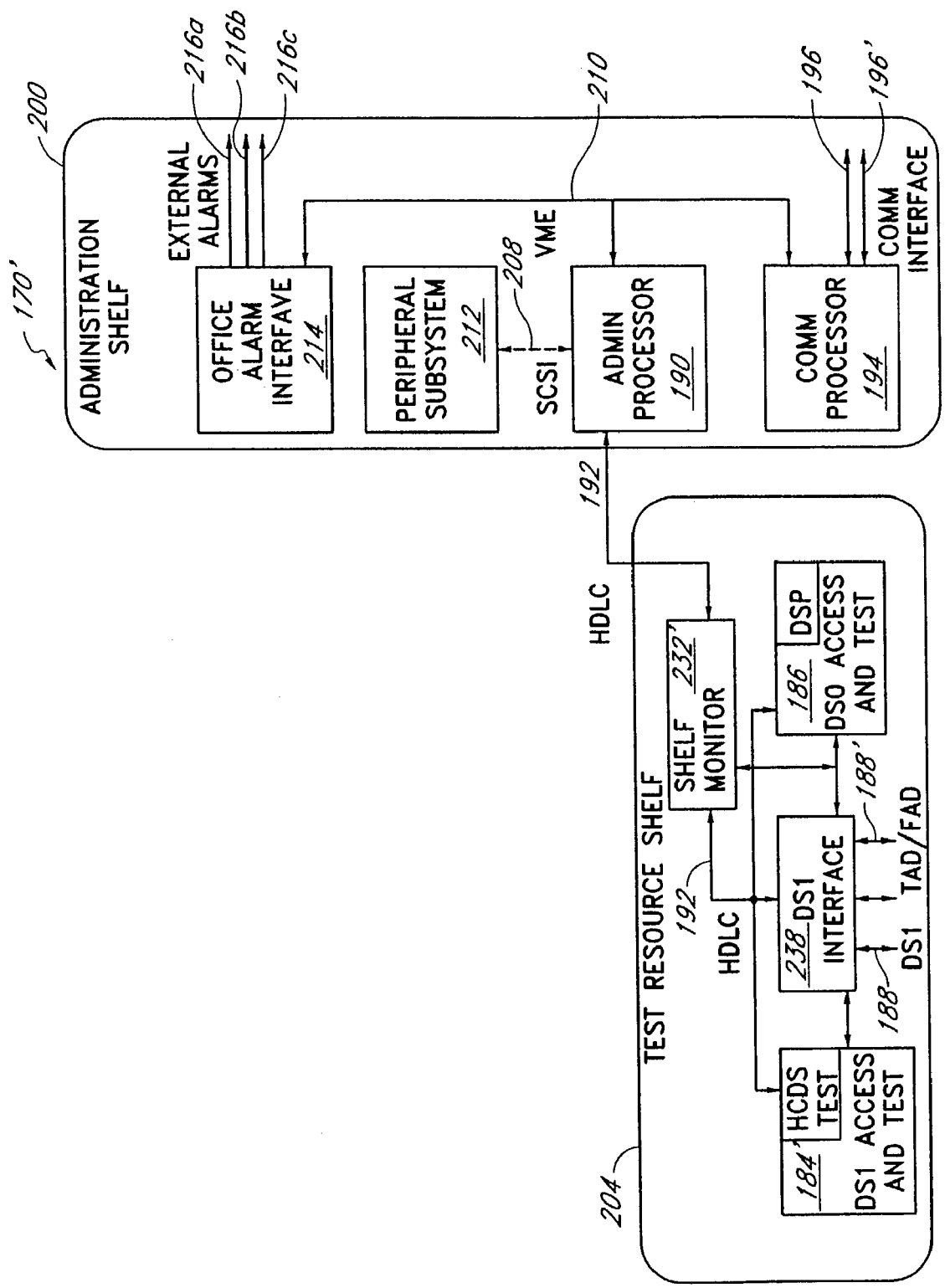
FIG. 4 is a functional block diagram of an exemplary interface device, the test system controller/remote test unit (TSC/RTU) system, shown in FIG. 2.

As shown in FIG. 4, the TSC/RTU 170' comprises a test resource shelf and an administration shelf. The TSC/RTU 170' system further comprises a real-time operating system and an extensive suite of applications software that is executed in response to commands received from the ECS 112 on distributed processing hardware. The operating system implements the distributed processing functionality of the TSC/RTU 170' by linking more than 350 dedicated microprocessors in a real-time computing environment. TSC/RTU 170' software architecture is designed to enable additional system features and capabilities to be installed easily through field software upgrades. DS3 and DS1 circuits may be transferred from the online main path to the redundant standby path without disruption of the embedded data streams. Hitless access is provided by accessing a low-speed circuit (e.g., DS0) embedded in a high-speed circuit (e.g., DS1) without affecting any other circuit embedded in the high-speed circuit. The TSC/RTU 170' provides access to the DS3 circuit, any embedded DS1 circuit, DS0 circuit, or the subrate circuit, without affecting any other circuit within the DS3 circuit. The TSC/RTU 170' may be collocated with or remotely located to the DCS 118.

Administration Shelf

As shown in FIG. 4, the Administration Shelf 200 contains the central computing elements and memory storage resources. This shelf also provides resources for intershelf communication and communication with support and management centers or personnel. Internal communication is in multiple serial communication protocols "Electronic Industries Association (EIA) 232" and "EIA 423". External interface language formats include TL1, PDS and MML. The Administration Shelf 200 is the source of system generated office alarms including audible, visual, and telemetry, as well as displays. The Administration Shelf 200 contains four hardware modules as described below.

The Administration Processor module 190 is the central system controller. It provides inter-shelf communication via the HDLC link 192 and communication with external interfaces through the Communication Processor module 194 described below. It uses serial interfaces for internal system control: a Small Computer System Interface (SCSI) interface 208 for control of peripherals such as the hard disk drive (not shown), and a VersaModule Eurocard (VME) data bus interface 210 to communicate with other VME standard modules. The SCSI interface 208 connects the Administration Processor module 190 to a Peripheral Subsystem 212, and the VME interface connects the module 190 to the Communication Processor module 194 and an Office Alarm Interface Module 214.

The Peripheral Subsystem 212 has a 1.44 megabyte floppy disk drive, a 105 megabyte hard disk drive, a 60 megabyte optional tape drive, and a Peripheral Module, none of which are shown on FIG. 4. These components store surveillance data and record user activity.

The Communication Processor module 194 provides the communication interface 196 to external Operations System (OS) or test system control centers (not shown). Interfaces are via TL1 or PDS. The electrical protocols are serial "EIA 232" or "EIA 423". Craft interface is MML with a user friendly overlay. Other communication 196' external to the system is done with TL1 and PDS using serial interface electrical protocols based on Consultative Committee for International Telephony and Telegraphy (CCITT) standard X.25.

The Office Alarm Interface Module 214 generates audible 216a, visual 216b, and telemetry 216c alarms for critical, major, and minor office alarms. It also receives and converts a DS1 based Building Integrated Timing Source (BITS) clock (not shown), providing clock and frame for internal synchronization. The BITS clock is a clock reference for an entire Central Office.

Test Resource Shelf

The Test Resource Shelf 204 supports test resource functionality for DS1, and a full range of DS0 and sub-DS0 testing. The TAD/FAD 188' port also provide interfaces for testing DS1s and DS0s via a DS1 access. The Test Resource Shelf 204 contains four modules as described below.

A DS1 Interface module 238 provides an ITAU System network interface at the DS1 rate that can be configured either as a TAD or FAD port. As a TAD interface 188, the DS1 Interface module 238 demultiplexes an incoming DS1 channel and extracts selected DS0 circuits for testing. Configured as a FAD interface 188', this module 238 receives, transmits, and loops the intact DS1 facility. Performance monitoring and test access supervision are also provided for HCDS testing of DS1s input via the FAD. The DS1 Interface module 238 connects to the DS1 Access and Test modules 184 and 184', the DS0 Access and Test module 186, and the Shelf Monitor module 232'.

The DS1 Access/Test module 184' provides HCDS testing to the embedded DS1s. This module supports simultaneous HCDS testing of two DS1 channels. The DS0 Access/Test module 186 incorporates digital signal processing (DSP) for DDS and VF testing of DS0 and subrate channels embedded in a DS3 or DS1 bit stream. Each module supports up to six simultaneous tests.

The Shelf Monitor module 232' serves as the intra-shelf communication interface. It provides retiming, buffering, and differential to single ended conversions of data and control lines.

B. Direct Test Access

Figure 7:
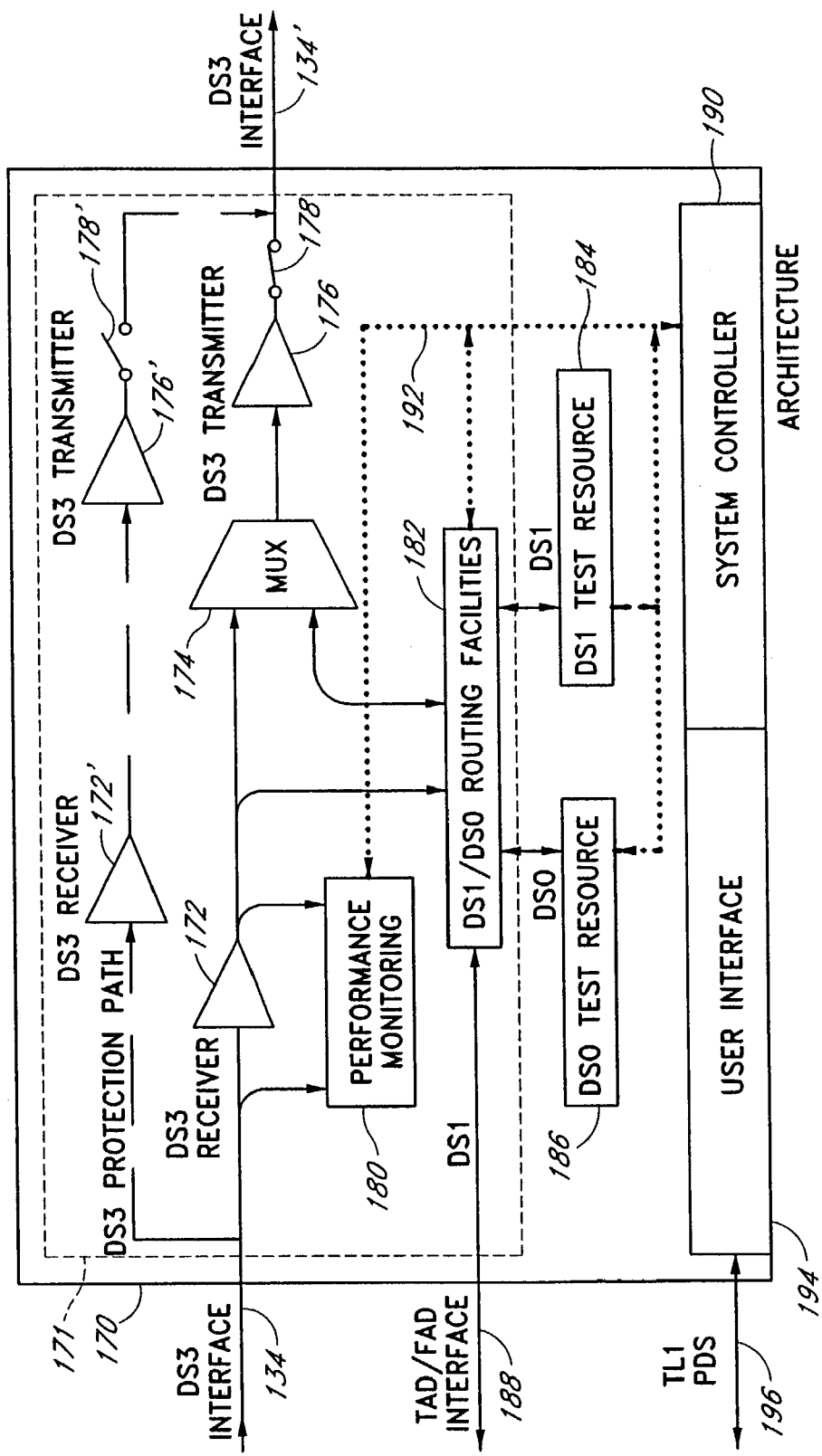
FIG. 7 is a functional block diagram of an exemplary interface device, the integrated test access unit (ITAU), shown in FIG. 3.

FIG. 7 is a functional block diagram illustrating the architecture of the ITAU System 170. The ITAU System 170 of the present invention connects in-line to as many as 48 bi-directional DS3 signals or 96 one-way DS3 signals, such as, for example, the DS3 signal fed across the line 134, to provide: continuous non-intrusive performance monitoring of DS3 and embedded DS1 channels; non-intrusive performance monitoring of DS0 and embedded channels, on demand; hitless access to multiplexed DS1, DS0 and subrate channels; intrusive or non-intrusive testing of DS1, DS0 and subrate channels; and an OS interface for reporting and control.

In general, the performance monitoring function stores notable events and calculates statistics such as error rates. Among others, the parameters and events monitored at the DS3 level by the ITAU System 170 include: frame format, bipolar violations (BPV) and loss of signal (LOS). DS3 level statistics, including, for example, frame format status, F bit error count and frame parity error count, are stored and reported to the OS. Similarly, DS1 level performance monitoring and statistics, and TAD/FAD performance monitoring are stored in memory by the system 170.

The ITAU System 170 also provides hitless monitor or split access to all DS1, DS0 and subrate channels in support of pre-service testing, verification or sectionalization of faults, and verification of repairs. A monitor access permits the system 170 to "listen" to the accessed channel as it passes through the system undisturbed. Establishing or tearing down a monitor access does not cause disruption to the channel or to other components of the bit stream. A split access breaks the normal through path of the channel and the received data from each direction has data inserted into the outgoing transmit channels.

Lastly, the ITAU System 170 provides non-intrusive test capabilities for extracting DS1, DS0 and subrate channels from received DS3 and DS1 bit streams without affecting the transmission of the same information through the system. Intrusive testing allows the writing of information into outgoing DS1, DS0 and subrate channels embedded in the DS3 bit stream. For example, intrusive tests include HCDS and DDS reconfiguration commands, looping commands, test patterns and voice frequency test tones, and complex waveforms such as those required for P/AR tests.

Again referring to FIG. 7, the DS3 signal received on the line 134 is fed through a receiver or regenerator 172, which outputs a DS3 signal having the same digital information, then through a combiner 174, and through a transmitter or regenerator 176. A primary path relay 178, shown to be closed, allows the DS3 signal to be output from this primary path across the output line 134'. Simultaneously, the incoming DS3 signal is fed through two regenerators 172', 176', but a second relay, termed the protect path relay 1784' is open thus preventing this protect path from feeding its DS3 signal to the output line 134'. The relays 178, 178' are operated cooperatively, as will be further discussed below, to apply the signal from only one of the two paths to the output line 134' thus providing fail-safe transmission of the DS3 signal through the ITAU System 170.

The performance monitoring functions of the ITAU System, as discussed hereinabove, are conducted in the functional block indicated in FIG. 4 at 180, which receives the DS3 signal from the primary path. Access and test functions are accomplished by feeding the DS3 signal from the primary path to a DS1/DS0 router 182 which selectively routes embedded channel data to one or more DS1 test resources 184 or DS0 test resources 186. Since DS1 and DS0 test systems are well-known, the function of the test resources 184, 186 will not be further discussed herein. A TAD/FAD interface line 188 for carrying a DS1 signal also connects to the router 182 so that the ITAU System 170 can be used as a remote test unit or as a local test unit for bit streams demultiplexed from incoming DS3 signals with external test equipment. Note that tests requiring bit overwrite communicate data via the router 182 to the combiner 174 where bits are selectively overwritten in the DS3 signal.

Performance monitoring, access and test are controlled by a system controller 190 via a High Level Data Link Control (HDLC) bus or link 192 connected to the performance monitor 180, DS1/DS0 router 182 and the DS1 and DS0 test resources 184, 186. The system controller 190 also communicates with a user interface subsystem 194 that provides communication to an OS (not shown) across a line 196 for control from remote locations. The user interface decodes messages sent in Transaction Language 1 (TL1), generally used by modern mechanized systems, or Program Documentation System (PDS) formats. Man-Machine Language (MML) is used to interface with craft technicians. Thus, a local telephone company, e.g., Bell South, or interexchange carrier, e.g., MCI, can gain immediate access to the DS3 and embedded channels by using the ITAU System 170 of the present invention.

Figure 8:
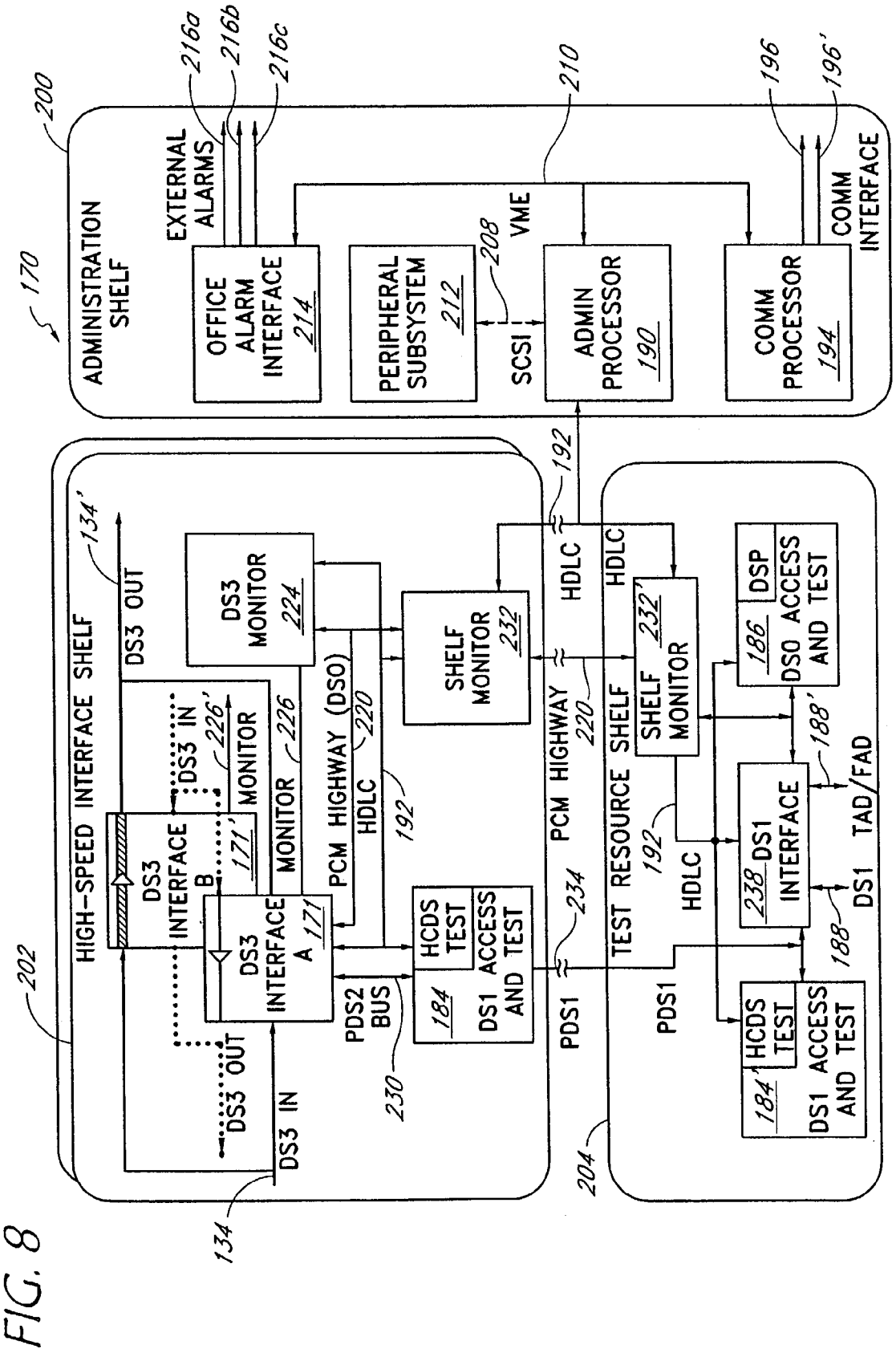
FIG. 8 is a system block diagram of the ITAU system shown in FIG. 7.

FIG. 8 is a system block diagram of the ITAU System 170. The ITAU System 170 integrates monitor, access, and test functions into one system having three shelves of hardware. A fully configured ITAU System 170 supporting 48 DS3s would be housed in two equipment bays, each bay supporting 5 shelves; one Administration Shelf 200, eight High Speed Interface Shelves 202, and one Test Resource Shelf 204. The ITAU System 170 is designed for operation in a central office environment.

The ITAU System 170 is modular in design, supporting the network as it expands and enabling easy integration of hardware and software capabilities. Each hardware module contains a processor complex, which will be described hereinbelow, that provides data collection, control, and communication to the central administration processor 190. Design of the ITAU System 170 was based on the philosophy that the addition of a network maintenance element should not degrade network reliability. To achieve this goal, the ITAU System 170 carefully monitors its circuitry and software functionality. The ITAU System 170 is protected by redundancy to an extent that causes the system to substantially exceed industry goals for network reliability. In order to further enhance ITAU System 170 reliability, each DS3 path is protected by a bypass repeater providing a one-to-one redundancy, which is automatically switched into service if the normal path through the ITAU System 170 should fail to pass any of several stringent internal diagnostic tests.

Administration Shelf

As shown in FIG. 8, the Administration Shelf 200 contains the central computing elements and memory storage resources. This shelf also provides resources for intershelf communication and communication with support and management centers or personnel. Internal communication is in multiple serial communication protocols "Electronic Industries Association (EIA) 232" and "EIA 423". External interface language formats include TL1, PDS and MML. The Administration Shelf 200 is the source of system generated office alarms including audible, visual, and telemetry, as well as displays. The Administration Shelf 200 contains four hardware modules as described below.

The Administration Processor module 190 is the central system controller. It provides inter-shelf communication via the HDLC link 192 and communication with external interfaces through the Communication Processor module 194 described below. It uses serial interfaces for internal system control: a Small Computer System Interface (SCSI) interface 208 for control of peripherals such as the hard disk drive (not shown), and a VersaModule Eurocard (VME) data bus interface 210 to communicate with other VME standard modules. The SCSI interface 208 connects the Administration Processor module 190 to a Peripheral Subsystem 212, and the VME interface connects module 190 to the Communication Processor module 194 and a Office Alarm Interface Module 214.

The Peripheral Subsystem 212 has a 1.44 megabyte floppy disk drive, a 105 megabyte hard disk drive, a 60 megabyte optional tape drive, and a Peripheral Module, none of which are shown on FIG. 8. These components store surveillance data and record user activity.

The Communication Processor module 194 provides the communication interface 196 to external Operations System (OS) or test system control centers (not shown). Interfaces are via TL1 or PDS. The electrical protocols are serial "EIA 232" or "EIA 423". Craft interface is MML with a user friendly overlay. Other communication 196' external to the system is done with TL1 and PDS using serial interface electrical protocols based on Consultative Committee for International Telephony and Telegraphy (CCITT) standard X.25.

The Office Alarm Interface Module 214 generates audible 216a, visual 216b, and telemetry 216c alarms for critical, major, and minor office alarms. It also receives and converts a DS1 based Building Integrated Timing Source (BITS) clock (not shown), providing clock and frame for internal synchronization. The BITS clock is a clock reference for an entire Central Office.

High Speed Interface Shelf

Each High Speed Interface Shelf 202 supports the capability to interface up to six bi-directional DS3 signal lines 134. Up to eight shelves can be provisioned to support a total of 48 DS3s per system. Each DS3 path 134 is supplied with one-for-one protection. Continuous performance monitoring at the DS3 rate of DS3 and DS1 parameters, hitless access to DS1 and all embedded DS0 channels, and drop and insert of DS1 and DS0 channels into a DS3 bit stream are provided. HCDS testing capability is provided for the proprietary formatted DS1 data that is available. Formatted DS0 data can be transported via a PCM Highway 220 to the Test Resource Shelf 204 for testing. The High Speed Interface Shelf 202 contains four hardware modules as described below.

A set of DS3 Interface modules (two modules are shown in FIG. 8) 171 and 171' interface the digital DS3 bit stream 134 and provide resources to demultiplex the DS3 into component DS1, DS0, and subrate channels. The DS3 Interface modules 171 and 171' connect to a Shelf Monitor module 232 and a DS3 Monitor module 224 via the PCM Highway 220. The DS3 Interface modules support DS3 regeneration circuity with drop and insert capability at DS1, DS0 and subrate digital levels. Full framing and continuous performance monitoring information is collected and reported at DS3 and DS1 levels. The module 171 contains DS3 protection and regeneration circuitry, providing one-for-one next-card protection for the DS3 bit stream on the adjacent module 171'.

The Shelf Monitor module 232 interconnects the DS3 Interface modules 171 and 171', the DS3 Monitor module 224 and the DS1 Access and Test module 184 using the HDLC link 192. The Shelf Monitor module 232 serves as the intra-shelf communication interface via the HDLC link 192 to the Administration Processor 190. The module 232 also connects to a Shelf Monitor module 232' on the Test Resource Shelf 204 via the PCM Highway 220. The Shelf Monitor module 232 provides retiming, buffering, and differential to single ended conversions of data and control lines.

The DS3 Monitor module 224 connects to the DS3 Interface modules 171 and 171' via Monitor bus 226 and 226', respectively. The DS3 Monitor module 224 performs fault management on the DS3 Interface modules 171 and 171' by doing a bit for bit compare. Error conditions are reported using the HDLC link 192. The DS1 Access/Test module 184 connects to the DS3 interface modules 171 and 171' via a Pseudo DS2 (PDS2) Bus 230. The module 184 also connects to the DS3 Monitor 224 via the PDS2 Bus 230 (link not shown). The DS1 Access/Test module 184 provides HCDS testing to the embedded DS1s. This module supports simultaneous HCDS testing of two DS1 channels. DS1 channels can be routed to the Test Resource Shelf 204 for testing via a Pseudo DS1 (PDS1) bus 234. There is one DS1 Access/Test module per High Speed Interface Shelf 202.

Test Resource Shelf

The Test Resource Shelf 204 supports test resource functionality for DS1, and a full range of DS0 and sub-DS0 testing. The TAD/FAD 188' ports also provide interfaces for testing DS1s and DS0s via a DS1 access. The Test Resource Shelf 204 contains four modules as described below.

A DS1 Interface module 238 provides an ITAU System network interface at the DS1 rate that can be configured either as a TAD or FAD port. As a TAD interface 188, the DS1 Interface module 238 demultiplexes an incoming DS1 channel and extracts selected DS0 circuits for testing. Configured as a FAD interface 188', this module 238 receives, transmits, and loops the intact DS1 facility. Performance monitoring and test access supervision are also provided for HCDS testing of DS1s input via the FAD. The DS1 Interface module 238 connects to the DS1 Access and Test modules 184 and 184', the DS0 Access and Test module 186, and the Shelf Monitor module 232'.

The DS1 Access/Test module 184' provides HCDS testing to the embedded DS1s. This module supports simultaneous HCDS testing of two DS1 channels. The DS0 Access/Test module 186 incorporates digital signal processing (DSP) for DDS and VF testing of DS0 and subrate channels embedded in a DS3 or DS1 bit stream. Each module supports up to six simultaneous tests.

The Shelf Monitor module 232' serves as the intra-shelf communication interface. It provides retiming, buffering, and differential to single ended conversions of data and control lines.

In summary, the PAAS system allows telephone companies to non-intrusively monitor-only individual circuits of restricted networks reported as problematic within seconds instead of hours. The continuous monitoring capability of the PAAS system allows telephone companies to detect circuit degradation before receiving customer complaints, and to initiate maintenance actions to restore the circuit to full functionality without affecting other users. The ability of the PAAS system to communicate with the DCS 118 offers command language translation between the DCS 118 and other facilities.

III. Analyzer Set

As shown in FIGS. 2 and 3, but with particular reference to FIG. 2, the preferable protocol set is a protocol analyzer 110. The protocol analyzer 110 passively monitors individual network circuits, usually testing from the bottom of the protocol stack upward. The protocol analyzer 110 performs service layer testing by decoding traffic, measuring bit error rates, and providing historical data from the network switches, routers, and other devices. A technician at the network maintenance center 100 can remotely control the protocol analyzer 110 via an X.25 or Ethernet control link 114 to perform full and fractional T1 testing of frequency, level, logical errors, frame errors, bipolar violations, CRC errors, density violations, slips, PRM, trouble scan, timeslot monitor and DDS code display.

The protocol analyzer 110 balances high performance and low cost. Typically, the protocol analyzer 110 may be implemented as one of three different architectures: software-based, hardware/PC, and integrated hardware. The protocol analyzer 110 is capable of copying all frames on the network regardless of their destination (this feature is known as operating in a promiscuous mode) to truly peek into various network data communications.

An exemplary protocol analyzer used in this invention is a self-contained network-capture device coupled with a PC interface, in the configurations of the present invention. For example, the Hewlett-Packard Co.'s Internet Advisor, Network General Corp.'s Expert Sniffer, or Wandel & Goltermann Technologies Inc.'s DominoLAN 1.3 analyzers may be used. The capture device consists of a specialized NIC 111, or it can be a standalone analyzer pod connected to a host computer by serial, parallel, or network cable. With this type of analyzer, the ECS 112 serves principally as a user interface for the capture hardware. The ECS 112 might decode frames stored in RAM, download capture files, or configure network-traffic generation. In any case, the analysis hardware is fed information from the controlling ECS 112; nearly all analysis functions are then performed independently by the analyzer 110 hardware. Unlike software-based analyzers, performance is not affected by the CPU of the ECS 112, which provides a user interface to the analyzer 110.

If direct analysis reporting is desired by a technician at the network site, then an integrated analyzer set, in which the capture hardware and a PC platform are tightly integrated in one box, may be used. This architecture is similar to that of the hardware/PC combination: The PC component provides a user interface for the hardware-capture component. With the integrated approach, the analyzer set 110 comprises a combination of processor, memory, platform, and NIC.

The protocol analyzer 110 performs three essential functions: monitoring, capturing/decoding, and traffic generation. The monitor function is central to the present invention, observing—but not necessarily capturing—network data traffic. From this raw data, frame rate, network utilization, and protocol conformance and distribution are calculated and reported back to the technician. These results can be displayed as skylines, pie charts, or histograms for the technician. The monitoring function is capable of delivering an accurate traffic count. Capturing and decoding is another function of the protocol analyzer set 110. The protocol analyzer set 110 is capable of accurately translating bit-filled packets, and copying frames—or portions of frames—into memory buffers, from which a technician can interpret the logical exchanges taking place in the network. Capturing/decoding is most often used to debug logical problems between communicating stations rather than the entire physical network. A technician can decide whether or not to capture frames during a monitoring session. In order to avoid the protocol analyzer buffer from overflowing, filters or slicing options may be incorporated in the protocol analyzer 110. These filters ensure copying only important data to the protocol analyzer, and unimportant frame types are ignored. On the other hand, slicing options copy just the frame headers, where the most important information is located, to the protocol analyzer 110.

The protocol analyzer 110 can function as a repeater by not participating in any circuit activities and simply relocking the electrical signal back on to the network. The protocol analyzer 110 reports to the technician at the network maintenance center 100 signal sample as captured by the logic analyzer, the phase/event history, and the data transferred within the signal sample.

IV. External Command Source

In the present invention, a data network technician may only execute a limited number of commands. More particularly, the data technician transmits specific commands to control the interface device and perform access, monitor-only, and test (where authorized) on the embedded channels of a DS3 or DS1 signal. Exemplary commands, their function, and the monitored or reported channel characteristics (where applicable) are described below.

ACT-USER (Activate User)

This command starts a user session with the Integrated Test Access Unit (ITAU). "Activate User" is equivalent to "logging on" to the system. The logon can be terminated using the CANC-USER command. This command can only be used via an ITAU which is not configured for automatic logout.

CANC-USER (Cancel User)

This command terminates a second user session with the ITAU while still logged on as another user. "Cancel User," in this case, is equivalent to "logging off" the secondary user from the system. This secondary logon can be initiated using the ACT-USER command. This command can only be used via an ITAU machine port.

CONN-TACC-T1 (Connect Test Access for T1 Circuit)

This command provides information required to process an access to the T1 circuit under test. Either a monitor access or a split access may be requested. The monitor access to the circuit under test is hitless. The presence of a signal is measured on the indicated input pair. The signal presence detector indicates presence of a signal if the average minimum pulse density ratio of ones to zeros is greater than 1:15.

CHG-ACCMD-T1 (Change Access Mode T1 Circuit Under Test)

This command changes the access mode for the circuit under test. In case of non-restricted access, either a monitor access or a split access may be requested. The presence of a signal is measure on the indicated input pair. The signal presence detector indicates presence of a signal if the average minimum pulse density ration of ones to zeros is greater than 1:15. CONN-TACC-T1 is a prerequisite for this command.

DISC-TACC (Disconnect Test Access)

This command releases access, returns the circuit to its normal state, and frees up the ITAU. This command successfully executes if a CONN-TACC command was previously executed. If a monitor/talk line was established for this access, it will be released as part of the execution of this command. (Note: active latching loopbacks will not be released part of this command).

MON-DDS (Monitor Digital Data Signal)

This command requests the determination of whether network control codes or customer data are present. Also, this command causes the retrieval of 1-byte or multiple-byte (up to 50) samples from the circuit under test. Errors in the DS1 and DS0B framing patterns may be counted. The counting starts after the frame is found. DISC-MEAS command may be used to prematurely stop this command and REPT-RESLT command may be used to provide intermediate results. This command executes with the circuit in any access state and execution of the command does not change the access state. CONN-TACC-T0y is a prerequisite for this command.

The parameters and their allowable values/limits are as follows:

<tsn>   1 to 999 (required)

<ctag>  null, or up to 6 user-defined alphanumeric characters (begins with alpha-character)

(optional) (Exception: Numeric only is also allowed)

```
<dir>     E, F or B (required>
<mos> M. S, ARM, SSM, MCM, or (S-1 to S-50) (required)
<nob> 1 to 50 (optional) (this parameter is used only when the value
for parameter
          <mos> = S-x)
<dur>    MMMM-SS (required)
         where MMMM = 0 to 9999
             SS = 0 to 60
<ri>     2 to 999 or S (optional)
```

MON-SIG-HCDS (Monitor and Characterize HCDS Signal)

This command provides non-intrusive HCDS signal characterization for special services circuits. It may be used in a bridging or monitoring configuration, as well as full split or looped access in the E or F direction.

The prerequisite for this command is the CONN-TACC-T1 command, and the command is discontinued using the DISC-MEAS or DISC-TACC commands. Intermediate results are always returned according to the value of the Reporting Interval (ri).

MON-SIG-T3 (Monitor and Characterize T3 Signal)

This command provides non-intrusive T HCDS signal characterization for special services circuits. It may be used in bridging or monitoring configuration, as well as full split access in the E or F direction.

The prerequisite for this command is the CONN-TACC-T3 command, and the command is discontinued using the DISC-MEAS or DISC-TACC commands. Intermediate results are always returned according to the value of the Reporting Interval (ri).

A typical general response format displayed at the ESC 112 for the technician is as follows:

```
cr lf SIGNAL = { DS1 [C] }
cr lf CODE** = { AMI    B8ZS    UNKNOWN    UNSUPPORTED }
cr lf FORMAT     = { ESF SF T1D DLC UNKNOWN }
cr lf DENSITY**  = { { 0 <i>} UNKNOWN   NA }
cr lf BPV**      = { { 0 <i>} UNKNOWN   NA }
cr lf CRCV       = { { 0 <i>} UNKNOWN   NA }
cr lf PATTERN    = { QRS 550CTET 3IN24 <24 BitPattern> NONE}
cr lf OOF        = { { 0 <i>} UNKNOWN NA }
cr lf COFA       = { { 0 <i>} UNKNOWN NA }
cr lf ALARM = { RED YELLOW AIS NONE   NA }
cr lf FBITERR    = { { 0 <i>}    NA }
CR LF 16ZEROS    = { { 0 <i>}    NA }
cr lf 8ZEROS = { { 0 <i>} NA }
cr lf SYNFAIL    = { YES   NO }
```

**Note: High-Speed SubSystem is not supported.

The parameters and their allowable values/limits are as follows:

```
<tsn>    1 to 999 (required)
<ctag> null, or up to 6 user-defined alphanumeric characters (begin with
alpha-character)
         (optional) (Exception: Numeric only is also allowed)
<dir>    E, F or B* (defaults to the access direction specified in the
         most recent
         CONN-TACC or CHG-ACCMODE) (optional)
<interval> 1 to 999 (default = 10) (optional)
```

RTRV-HDR (Retrieve Message Header)

This command instructs the ITAU to retrieve and display the data items that it places on its standard TL1 output header. These items are the ITAU's SID code, the current date and current time.

V. Method Of Operation

Figure 5:
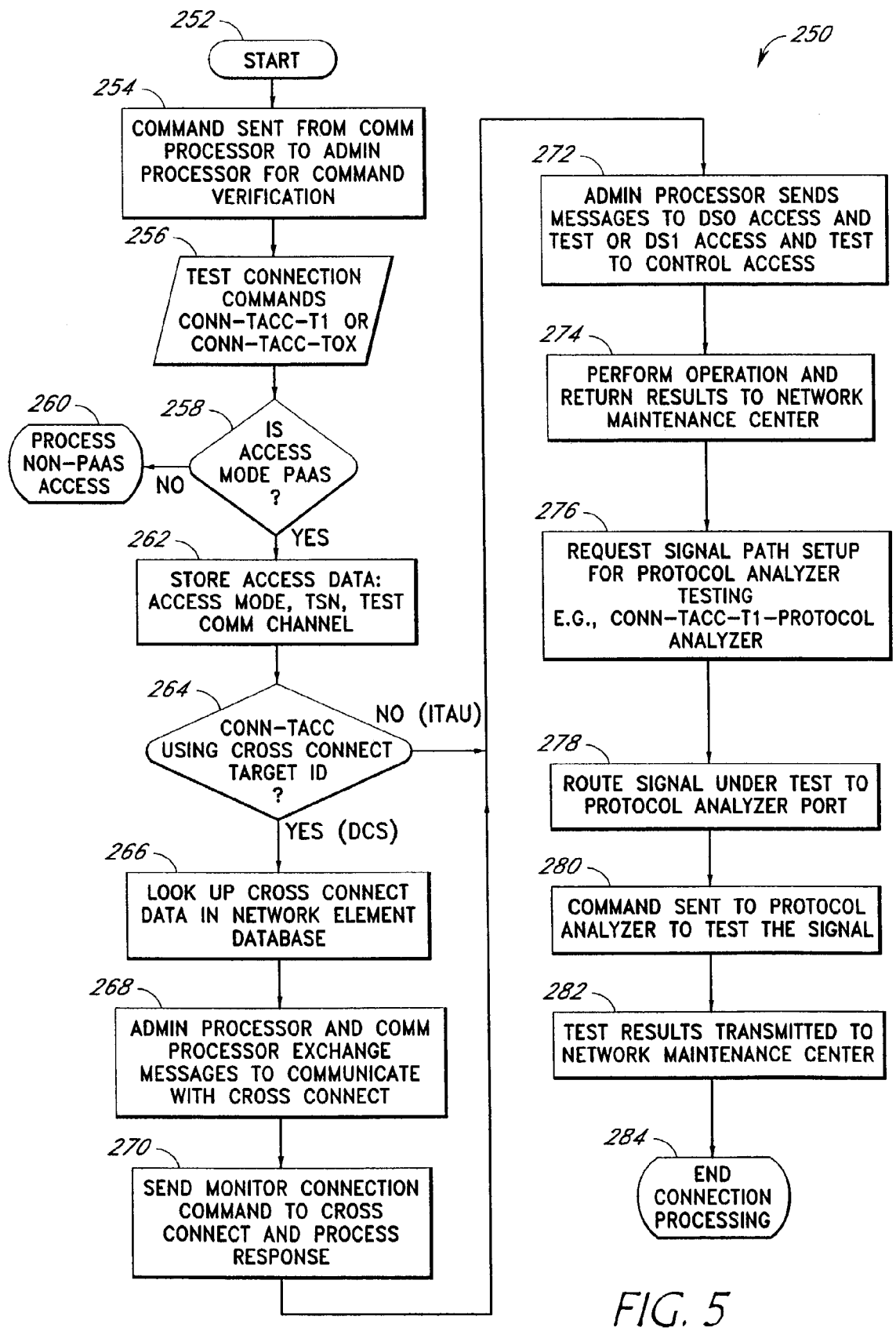
FIG. 5 is an operational flowchart of the access and monitor/test connection command processing method of the present invention.

Referring to FIG. 5, the protocol analysis access system (PAAS) utilizes a process 250 for test connection command processing to initiate a test access. This process determines if the access mode is for a monitor-only mode access, and if so, allows monitoring of individual circuits over network through a digital cross-connect system (DCS) or directly.

Beginning at a start state 252, the process 250 moves to state 254 wherein the ECS 112 (FIGS. 2,3) sends a test connection command to the communication processor 194 (FIG. 8) over the X.25 communication interface 196'. The communication processor 194 sends the received command to the administration processor 190 for command verification. As shown at state 256, the test connection commands include a command for testing DS1 channels (conn-tacc-t1) and a command for testing DS0 channels (conn-tacc-t0x). Continuing at a decision state 258, process 250 determines whether the access mode is for PAAS (i.e. monitor-only or restricted access). The access mode command selection is performed by use of the ECS 112, and is described in conjunction with FIG. 6. If non-PAAS access is requested, process 250 completes at state 260 and returns to allow non-PAAS access processing, such as intrusive testing or monitoring on authorized circuit network(s) only.

If however, the process determines that a PAAS mode access is requested, as determined at decision state 258, process 250 continues at state 262 wherein the access data, including the access mode (PAAS), a test sequence number (TSN), and a selected test communication channel, are stored. The TSN is preferably a number between one and 999 that identifies a particular test sequence or session. Proceeding to a decision state 264, process 250 determines whether the connection test access command is for a circuit that is accessible through the TSC/RTU 170' (FIG. 2) or through the ITAU 170 (FIG. 3).

If it is determined that access is by the TSC/RTU 170', process 250 initiates a monitor access with the digital DCS 118 (FIG. 2). Moving to state 266, process 250 retrieves data about the DCS 118 from a network element database (not shown). This database includes information about the network elements in the system, such as the DCSs, and includes information such as make and model of the element, connected ports, signal level, e.g., DS1, and so forth. Note that states 258, 262, 264 and 266 are performed by the administration processor 190. Advancing to state 268, the communication processor 194 (FIG. 8) exchanges messages with the administration processor 190 to communicate with the DCS 118. At state 270, a monitor connection command, e.g., "ttst mon to" or "conn-tacc", is sent to the DCS 118 by the communication processor 194, and the subsequent DCS response is processed by process 250.

At the completion of state 270 or if is determined at decision state 264 that the signal access is through an ITAU 170, process 250 moves to state 272. At state 272, the administration processor 190 sends messages to the DS1 Access and Test module 184' or the DS0 Access and Test module 186 for controlling access within the interface device (TSC/RTU 170' or ITAU 170). Continuing at state 274, the interface device performs a desired operation or function, e.g., monitor, and preferably returns the results of the operation to the network maintenance center 100 (FIGS. 2,3). In another embodiment, the operation is initiated by a technician at a location of the interface device and the results of the operation are returned for display to the technician.

Proceeding to state 276, a technician or operator at the network maintenance center 100 requests setup of the signal path for testing by the protocol analyzer 110 (FIGS. 2,3). Moving to state 278, process 250 routes the signal under test in the interface device to its TAD/FAD port 188' to the protocol analyzer 110 (FIGS. 2,3). At this point in time, the signal is ready to be tested by the protocol analyzer 110. Proceeding to state 280, a technician at the network maintenance center 100, using the ECS 112, commands the protocol analyzer 110 via the control link 117 to test the signal (from state 278). Moving to state 282, the protocol analyzer 110 preferably transmits test results back to the technician at the network maintenance center 100 via the data link 114. In another embodiment, the test results are transmitted to the network maintenance center 100 for processing by an analysis program and the results are provided to the technician or other support personnel. In yet another embodiment, the protocol analyzer 110 performs an analysis of the test results and transmits the analysis results back to the network maintenance center 100. Connection processing process 250 completes at state 284.

Figure 6:
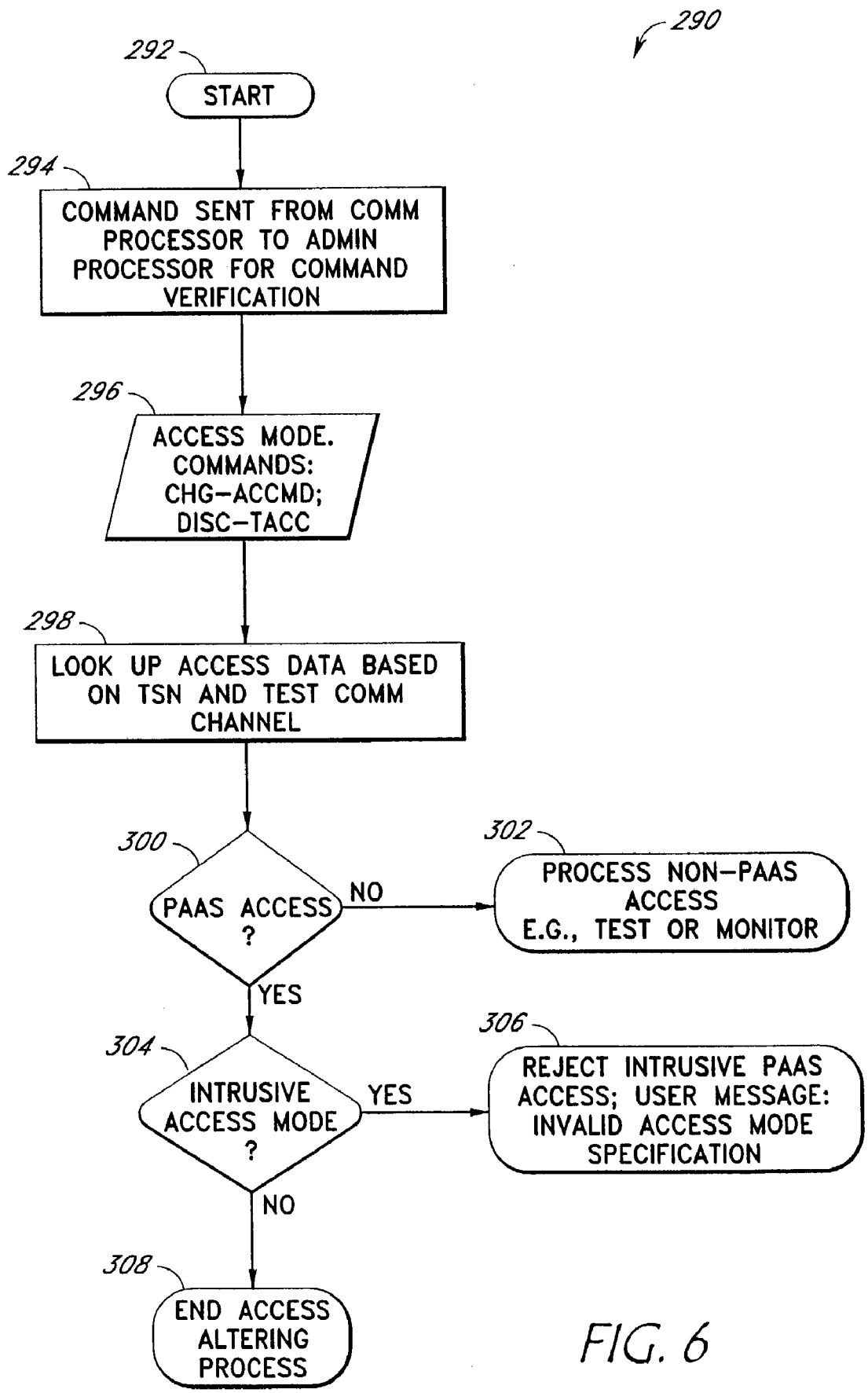
FIG. 6 is an operational flowchart of the access altering command processing method of the present invention.

Referring to FIG. 6, the PAAS system utilizes a process 290 for access altering command processing to process the test access, e.g., change the access mode or disconnect a test access. This process determine a type of access and returns in one of three conditions.

Beginning at a start state 292, the process 290 moves to state 294 wherein the ECS 112 (FIGS. 2,3) sends a access mode command to the communication processor 194 (FIG. 8) over the X.25 or Ethernet communication interface 196'. The communication processor 194 sends the received command to the administration processor 190 for command verification. As shown at state 296, the access mode commands include a command for changing the access mode (chg-accmd) and disconnecting the test access (disc-tacc). If the command is "disc-tacc", the administration processor 190 releases the circuit under test back to the DCS 118 (in case of access through a DCS), and the process 290 completes the access altering processing at state 308.

Proceeding to state 298, process 290 looks up the access data based on the test sequence number (TSN) and the test communication channel. This data was previously stored by execution of state 262 (FIG. 5). Moving to a decision state 300, process 290 determines whether the access mode is for a PAAS access (i.e. monitor-only or restricted access). The change access mode command sets the type of access mode. If non-PAAS access is requested, process 290 completes at state 302 and returns to allow non-PAAS access processing, such as intrusive testing or monitoring on authorized circuit network(s) only.

If however, process 290 determines that a PAAS mode access is requested, as determined at decision state 300, process 290 continues at state 304 wherein a determination is made whether the PAAS access is in an intrusive mode. If so, process 290 moves to state 306, rejects the intrusive PAAS access request, and completes execution. The administration processor 190 preferably generates a user message "Invalid Access Mode Specification" and an error code "SABT" signifying Status Aborted. However, if it is determined at decision state 304 that the access mode is non-intrusive, process 290 completes the access altering processing at state 308 and returns to allow PAAS access processing, such as testing or analysis by the protocol analyzer 110 (FIGS. 2,3). Note that states 298, 300 and 304 are performed by the administration processor 190.

What is claimed is:

1. A system for testing at least one communication link, the system comprising:
    a test unit configured to perform testing of data in the communication link;
    an interface device in communication with the test unit, the interface device configured to access data from the communication link; and
    a controller, located remotely from the interface device, the controller being configured to communicate at least one command to the test unit via a data communications network, wherein the command is indicative of at least an instruction to the test unit to test at least one circuit of the communication link, and wherein the controller is configured to permit access to the circuit by a predetermined group of users.

2. The system of claim 1, wherein the test unit comprises at least one of a remote test unit (RTU) and a protocol analyzer.

3. The system of claim 1, wherein the interface device is configured to access at least one of a DS1, DS3, T1, and T3 signals of a public switched telephone network (PSTN).

4. The system of claim 3, wherein the interface device is configured to access the communication link directly or via a cross-connect switch.

5. The system of claim 1, wherein the test unit is configured to perform testing of at least one of a physical characteristic and a logical characteristic of the communication link.

6. The system of claim 5, wherein the test unit comprises at least one of a protocol analyzer and a physical circuit test unit.

7. The system of claim 1, wherein the controller is configured to communicate at least one command via at least one of the public Internet, a private data communications network, a local area network (LAN), a wide area network (WAN), and a dedicated communication link.

8. The system of claim 1, wherein the interface device comprises a test unit providing access through one of a plurality of digital cross-connect system.

9. The system of claim 1, wherein the interface device comprises an integrated test access unit capable of providing test access through directly connected circuits.

10. The system of claim 1, wherein the interface device comprises test unit providing access to a channel embedded in the signal through one of a plurality of digital cross-connect system.

11. The system of claim 1, wherein the command comprises at least one TL1 command.

12. A system for testing at least one communication circuit, the system comprising:
    an interface device configured to access data from a communication circuit;
    a controller configured to communicate at least one command to the test unit via a data communications network, wherein the command is indicative of at least an instruction to access the communication circuit; and
    a module configured to permit access to at least one user provided that the user is in a allowable group of users and further configured to reject at least one user when the user is absent from the allowable group of users.

13. The system of claim 12, wherein the interface device comprises a test unit providing access to a channel embedded in the circuit through one of a plurality of digital cross-connect systems.

14. The system of claim 12, wherein the controller is configured to access a database of network elements.

15. The system of claim 12, wherein the controller comprises a computer.

16. The system of claim 12, wherein the controller is separated physically from the location of the interface device by at least one communications network.

17. A system for testing at least one communication circuit, the system comprising:
- a test unit comprising at least one port, wherein the test unit is configured to access data from the communication circuit through the at least one port, and the at least one port being selected in accordance with the bandwidth of the circuit being tested; and
- a controller configured to communicate at least one command to the test unit via the data communications network, wherein the command is indicative of at least an instruction to the test unit to access data from the communication circuit.

18. The system of claim 17, further comprising:
- a protocol analyzer configured to perform logical testing of data transmissions in the communication circuit;
- the test unit in communication with the protocol analyzer; and wherein
- the controller is further configured to communicate at least one command to the protocol analyzer via a data communications network, the command being indicative of at least an instruction to the protocol analyzer to test the communication circuit.

19. The system of claim 17, wherein the controller is physically separated from the test unit by at least the data communications network.

20. The system of claim 17, wherein the controller comprises a computer.

21. The system of claim 17, wherein the controller is configured to control a plurality of test units.

22. The system of claim 17, wherein the controller is configured to selectively communicate a command to the test unit based on preselected criteria.

23. The system of claim 22, wherein the preselected criteria comprises a user identification.

24. The system of claim 17, wherein the circuit comprises a DS0 circuit.

25. The system of claim 17, wherein the circuit comprises a DS1 circuit.

26. The system of claim 17, wherein the circuit comprises a DS3 circuit.

27. The system of claim 17, wherein the port comprises a Facility Access Digroup (FAD) port for wideband testing.

28. The system of claim 17, wherein the port comprises a Facility Access Digroup (FAD) port configured for narrowband testing.

29. The system of claim 17, wherein the port comprises a Test Access Digroup (TAD) port configured for narrowband testing.

30. The system of claim 17, wherein the test unit comprises at least a second port, the second port being selected in accordance with the bandwidth of a second circuit being tested.

31. The system of claim 30, wherein the circuit comprises a DS0 circuit.

32. The system of claim 30, wherein the circuit comprises a DS1 circuit.

33. The system of claim 30, wherein the circuit comprises a DS3 circuit.

34. The system of claim 30, wherein the second port comprises a Facility Access Digroup (FAD) port configured for wideband testing.

35. The system of claim 30, wherein the second port comprises a Facility Access Digroup (FAD) port configured for narrowband testing.

36. The system of claim 30, wherein the second port comprises a Test Access Digroup (TAD) port configured for narrowband testing.

37. The system of claim 30, wherein the data communications network comprises a TCP/IP network.

38. The system of claim 37, wherein the TCP/IP network comprises the Internet.

39. The system of claim 17, wherein the data communications network comprises a X.25 network.

40. The system of claim 17, wherein the data communications network comprises an RS-232 interface.

41. The system of claim 40, wherein the RS-232 interface is coupled to a telephone line modem.

42. The system of claim 17, wherein the data communications network comprises an Ethernet link.

43. A method of testing at least one communication circuit, the method comprising:
- identifying a user to determine whether the user is authorized to perform the command to access the circuit;
- denying access to the circuit to the user if not authorized;
- selecting at least one port of an interface device for accessing data in a communications circuit in accordance with the bandwidth of the circuit being tested;
- accessing data from a communication circuit through the selected port of the interface device; and
- communicating at least one command from a controller to a test unit via a data communications network, wherein the command is indicative of at least an instruction to the test unit to test at least one circuit of the communication link.

44. The method of claim 43, further comprising performing logical testing of data transmissions in the communication circuit.

45. The method of claim 43, wherein selecting at least one port includes designating a first port for testing a DS0 circuit.

46. The method of claim 45, further comprising designating a second port for testing a DS3 circuit.

47. The method of claim 43, further comprising testing the data in the communications link using the test unit.

48. The method of claim 43, wherein the data communications network comprises a TCP/IP network.

* * * * *